United States Patent [19]
Yamamuro et al.

[11] Patent Number: 5,973,791
[45] Date of Patent: Oct. 26, 1999

[54] DATA COMMUNICATION METHOD FOR TRANSMITTING DOCUMENT DATA FROM AN EXTERNAL APPARATUS TOGETHER WITH COVER INFORMATION TO A PLURALITY OF COMMUNICATION PARTNERS

[75] Inventors: Soichi Yamamuro, San Jose, Calif.; Seishi Ejiri, Kawasaki, Japan; Masaya Kondo, Great Neck, N.Y.; Takekazu Kumagai, Yokohama, Japan; Takeshi Tsukamoto, Kawasaki, Japan; Kazuomi Oishi, Yokohama, Japan; Masaru Saruwatari; Masaki Toyama, both of Kawasaki, Japan

[73] Assignee: Canon Kabushiki Kaisha, Tokyo, Japan

[21] Appl. No.: 08/814,317

[22] Filed: Mar. 11, 1997

[30] Foreign Application Priority Data

Mar. 13, 1996 [JP] Japan .................... 8-056075

[51] Int. Cl.⁶ .................................................. G06F 13/00
[52] U.S. Cl. ........................ 358/403; 358/400; 358/407
[58] Field of Search .................... 358/403, 400, 358/407; 707/1; 704/2, 3; 379/88.24

[56] References Cited

U.S. PATENT DOCUMENTS 5,175,684 12/1992 Chong ............................ 704/3
5,339,169 8/1994 Meguro et al. ................. 358/403
5,357,562 10/1994 Metser et al. ................ 379/88.24
5,497,319 3/1996 Chong et al. .................... 704/2
5,819,250 10/1998 Trader et al. ..................... 707/1

*Primary Examiner*—Le Hien Luu
*Attorney, Agent, or Firm*—Fitzpatrick, Celia, Harper & Scinto

[57] ABSTRACT

Document data is transferred from a facsimile server 118 to a facsimile apparatus 201 to transmit the document data to a plurality of destinations via a communication line 116. The document data is stored in an image memory in the facsimile apparatus 201. A cover page specific to each of the destinations is input from the facsimile server 118 to the facsimile apparatus 201. The facsimile server 118 specifies IDs and the order of transmission of the files so that the cover page is transmitted first, followed by the document data, in a series of information. The facsimile apparatus 201 transmits them to the proper destination in accordance with the cover page. This process is repeated each time a cover page input is made until transmission to all destinations is completed. When document data from an external apparatus such as a computer transferred to the data communication apparatus such as a facsimile is transmitted to a plurality of destinations, the cover page specific to each destination is attached to the document data without unnecessary redundant proceeding.

17 Claims, 5 Drawing Sheets

DATA COMMUNICATION METHOD FOR TRANSMITTING DOCUMENT DATA FROM AN EXTERNAL APPARATUS TOGETHER WITH COVER INFORMATION TO A PLURALITY OF COMMUNICATION PARTNERS

BACKGROUND OF THE INVENTION

1. Field of the Invention

The present invention relates to a data communication method in a data communication system comprising an external apparatus and a data communication apparatus.

2. Description of the Related Art

In one of known communication systems, computers such as a personal computer are directly connected to a data communication apparatus such as a facsimile machine, and document data produced on the computer is transmitted to a communication partner or a destination apparatus via the facsimile machine. The document data produced on the computer is transferred to the facsimile machine, while issuing at the same time a transmission request command including destination information about the destination apparatus and the information specific to the document data, and upon receiving the command, the facsimile machine then transmits to the destination apparatus the document data specified in the destination information. When a cover page (an invoice indicating the summary of the document, the name of a sender, and the destination) is necessary, it may be attached as the header of the document data before the document data is transferred to the facsimile machine.

To send the same document data to a plurality of destinations, the above conventional method treats the cover page as a part (first page) of the document data. Thus, the document data is transferred to the facsimile machine on a destination by destination basis, or transferred without a cover page to all destinations.

SUMMARY OF THE INVENTION

It is an object of the present invention to provide a data communication method free from the above problem.

It is another object of the present invention to provide a data communication method that allows a cover page specific to each of a plurality of destinations to be attached to document data without unnecessary redundant processings when the document data, transferred to a data communication apparatus such as a facsimile apparatus from an external apparatus such as a computer, is transmitted to the plurality of destinations.

It is yet another object of the present invention to provide a data communication method that presents an improved data transfer efficiency between an external apparatus and a data communication apparatus.

It is yet another object of the present invention to provide a data communication method that allows the same document to be transmitted to a plurality of destinations with a proper cover page attached on the same document specific to each of the destinations.

It is yet another object of the present invention to provide a data communication method that helps easily check the result of transmission of a document.

These and other objects of the present invention will become more apparent when the following description of the invention is considered with the drawings.

DESCRIPTION OF THE PREFERRED EMBODIMENTS

Figure 1:
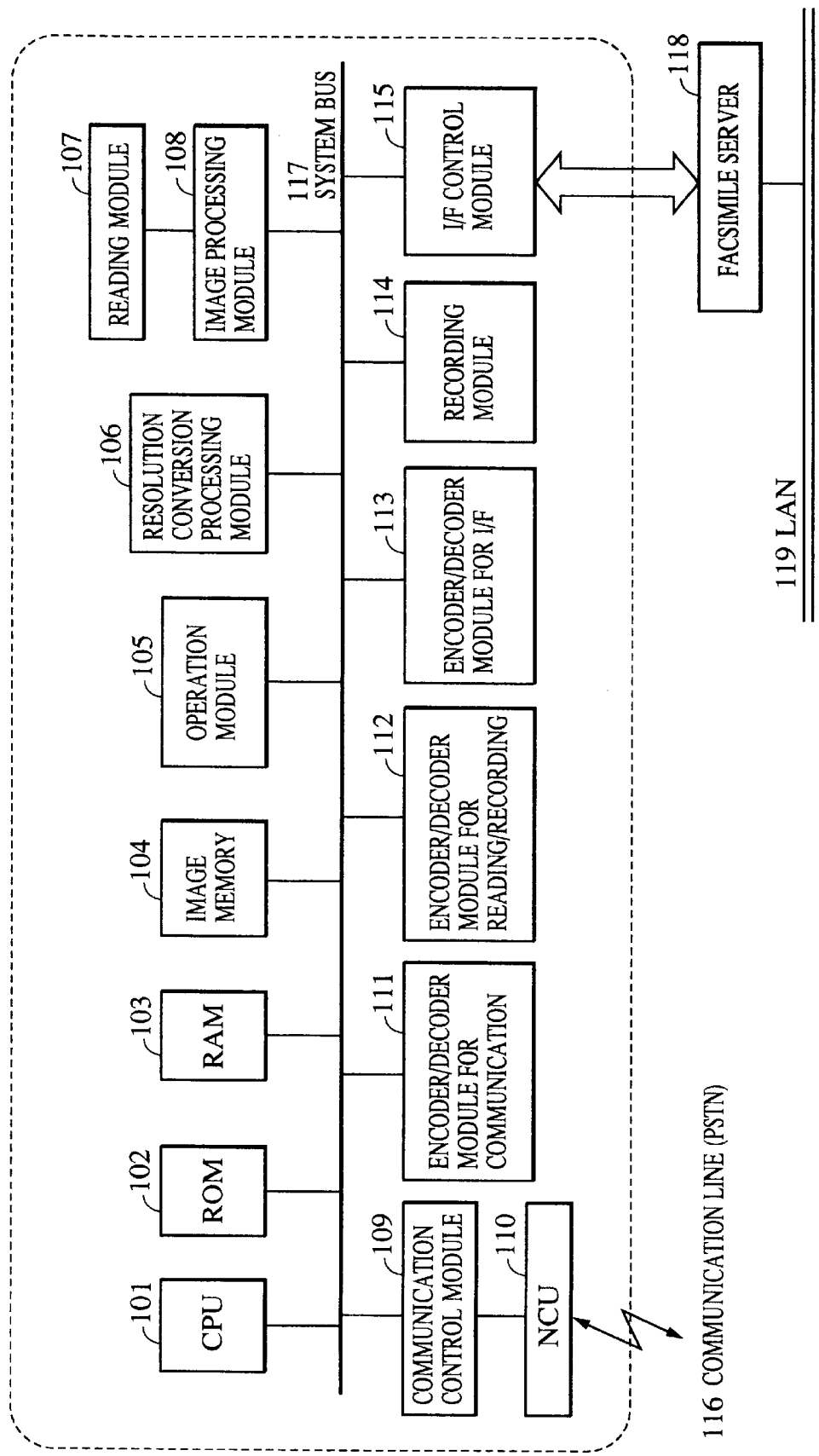
FIG. 1 is a block diagram of a facsimile apparatus and its server according to one embodiment of the present invention.

Referring now to the drawings, one embodiment of the present invention is discussed.

FIG. 1 is a block diagram of a facsimile apparatus of the present invention.

CPU 101 generally controls the facsimile apparatus. ROM 102 stores a control program according to which CPU 101 controls the apparatus. RAM 103 stores control variables and values an operator has set.

An image memory 104 stores image data. The image memory 104 stores transmitting facsimile image data and cover page image data transferred from a facsimile server 118, as separate files having respective management ID numbers. The file management ID number, along with type information indicating whether the file is a transmitting image file or a cover page file, is stored in RAM 103.

Designated 105 is an operation panel through which a diversity of inputs are entered. A resolution conversion processing module 106 performs millimeter-inch resolution conversion to raster image data. A reading module 107 optically picks up the image of a document and converts it into electrical image data, and is constructed of a CS image sensor, a document transport mechanism and the like. An image processing module 108 performs a diversity of image processings to the image data read by the reading module 107.

A communication control module 109 is used to exchange data with a partner communication apparatus via a communication line (PSTN: public switched telephone network) 116, and is constructed of a modem for modulating and demodulating data, and the like. Network control unit (NCU) 110 transmits and receives call control signals over the line 116. An encoder/decoder module 111 encodes and decodes image data communicated through the communication control module 109, an encoder/decoder module 112 for reading/recording encodes and decodes image data read through the reading module 107 and image data to be recorded by a recording module 114, and an encoder/decoder module 113 for interface encodes and decodes image data transmitted and received through an interface control module 115.

The recording module 114 records an image received and a communication result report on a recording paper. The image of the communication result report is produced on the image memory 104. The communication result report is made as follows: the information about the communication result stored in RAM 103 is produced as an image on the image memory 104, and part of image data received or transmitted overwrites the produced report image. The resulting image is then transferred to the recording module 114 to be recorded there.

The interface control module 115 carries out data communication with the facsimile server 118. The image data to be transmitted in facsimile communication comes in from the facsimile server 118 via the interface control module 115, and is then accumulated as a file in the image memory 104. CPU 101 generates a management ID for managing the image data file, and notifies the facsimile server 118 via the interface control module 115 of the management ID. Also, RAM 103 stores the management ID according to which the information about the image data is managed. A system bus 117 interconnects the above-described modules as shown in FIG. 1.

The facsimile server 118, connected to the facsimile apparatus via the interface control module 115, is also connected to LAN (Local Area Network) 119. The facsimile server 118 receives a transmission request from a client (using a terminal on LAN 119), and controls the facsimile apparatus. The facsimile server 118 transmits predetermined commands, parameters and data to the facsimile apparatus via the interface control module 115. The facsimile server 118 is provided with a keyboard, a pointing device and the like. By operating these devices or in response to the instructions from the client on the LAN, a cover page (an invoice) for facsimile transmission is produced on the facsimile server 118. To cause the facsimile apparatus to transmit the image file, the facsimile server 118 specifies the corresponding ID number. The facsimile server 118 is loaded with application softwares and drivers to perform a diversity of processings including the control of the facsimile apparatus and processing in response to the commands from LAN 119. In this way CPU in the facsimile server 118 controls the facsimile apparatus.

Figure 2:
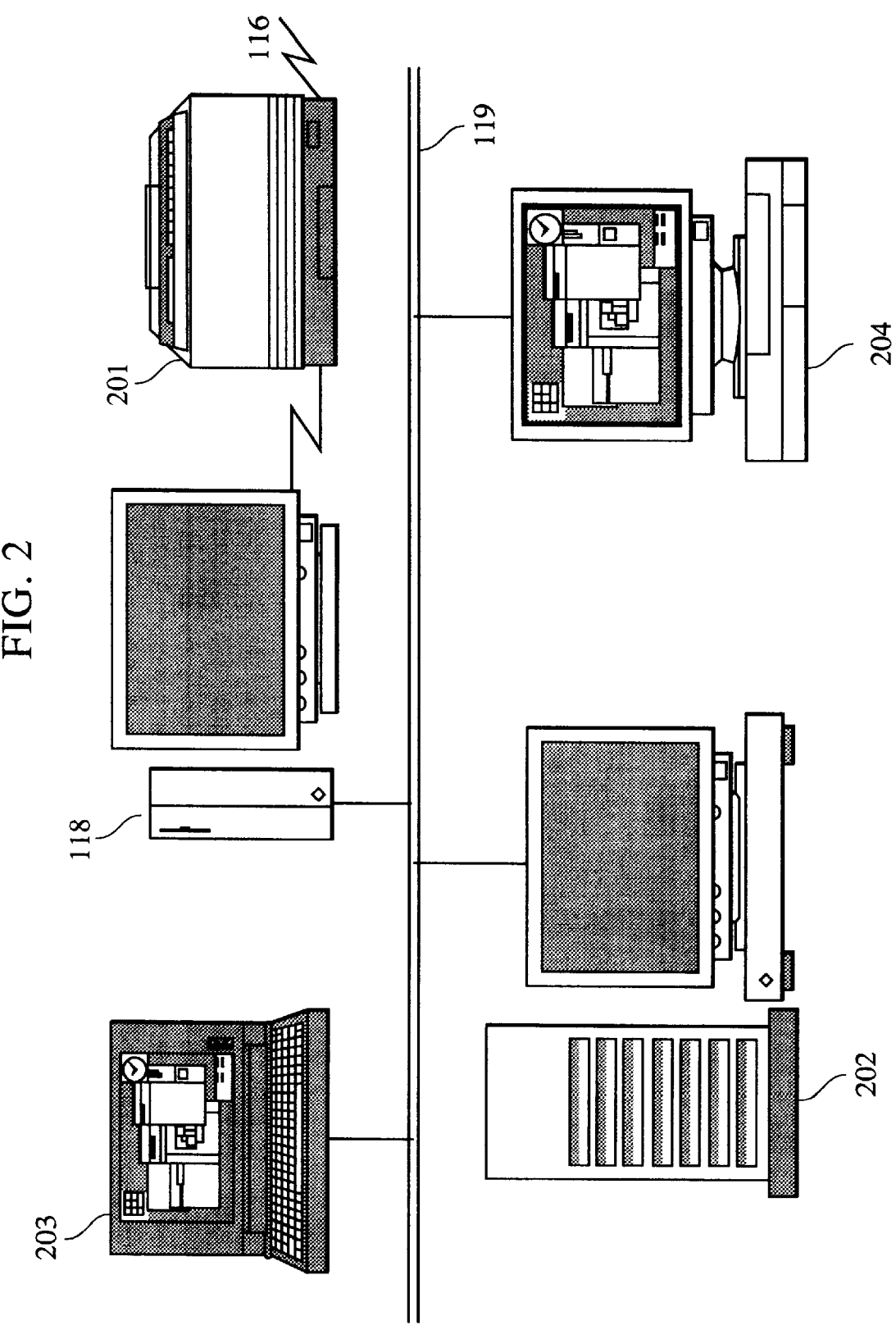
FIG. 2 is a system diagram of the facsimile apparatus and its server in FIG. 1 linked to a local area network.

FIG. 2 is a system diagram of the facsimile apparatus and its server in FIG. 1 linked to the LAN 119.

Designated 201 is the facsimile apparatus shown in FIG. 1, which is connected to LAN 119 via facsimile server 118. A file server 202 performs file management and accumulation on LAN 119. Client machines 203 and 204 create and edit a diversity of document data, and make a transmission request to the facsimile server 118 to transmit document data via the communication line 116. The client machines 203, 204 log in the facsimile server 118 to notify that they exist on LAN 119 and where they are on LAN 119.

Figure 3:
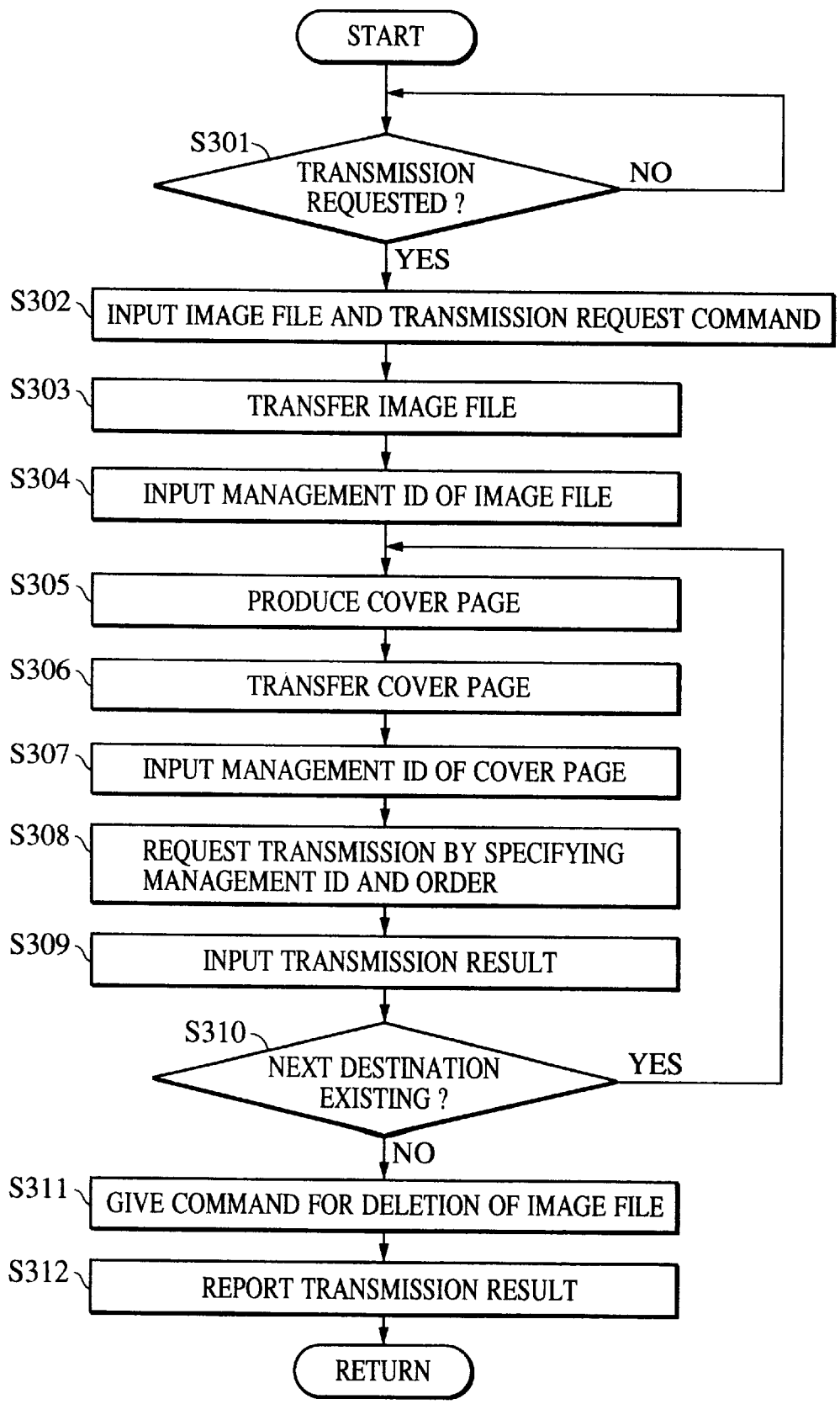
FIG. 3 is a flow diagram showing the flow of process by a facsimile server 118 when document data is transmitted to a destination.

FIG. 3 is a flow diagram showing the flow of process by the facsimile server 118 when a client makes a transmission request for document data using a client machine 203 or 204 on LAN 119. The flow diagram shows the process flow the CPU in the facsimile server 118 takes under the control of an installed program therein.

At step S301, the facsimile server 118 waits for a transmission request from a client via LAN 119. When a transmission request comes in, the sequence goes to step S302, where the facsimile server 118 receives document data to be transmitted (image file) and transmission request commands (including a telephone number of a destination or a plurality of telephone numbers if addressed to a plurality of destinations; the name of a sender; a command indicating whether a timer transmission is used, and the time the timer transmission is scheduled; comments written on a cover page). Suppose now that the same document data is addressed to a plurality of destinations.

The facsimile server 118 transfers an image file of document data to be transmitted to the facsimile apparatus 201 via the interface control module 115 at step S303. The facsimile server 118 receives from the facsimile apparatus 201 a management ID number for managing the image file at step S304. A plurality of clients may place transmission requests in succession. In such a case, transmission requests may be awaited for a predetermined duration of time, and document data (as a plurality of files) addressed to the same destination, among transmission requests received within the duration, may be transferred to the facsimile apparatus 201 at a time.

At step S305, a cover page for a single facsimile communication addressed to a single destination is produced. The cover page bears the name of a sender, the name of an addressee, and the summary of the document that is not extracted from the transmission request commands. At step S306, the cover page is transferred to the facsimile apparatus 201 as an image file, and at step S307, a management ID number for managing the image file corresponding to the cover page is received from the facsimile apparatus 201.

At step S308, the facsimile server 118 specifies the management ID number for the document data received at step S304 and the management ID number for the cover page received at step S307, and further specifies the order of transmission that causes the cover page to precede the document data, and places to the facsimile apparatus 201 a transmission request along with the telephone number for dialing a destination (corresponding to the cover page) for that single communication.

At step S309, the facsimile server 118 receives transmission result information (about a normal or abnormal termination in last transmission, and the cause if the transmission ends with an abnormal termination) in response to the transmission request made at step S308. At step S310, the facsimile server 118 makes a determination of whether there is still a next destination (whether transmission to all destinations input at step S302 is completed). When any destinations remain, the sequence starts over at step S305. When all destinations are completed, the sequence goes to step S311, where the facsimile server 118 instructs the facsimile apparatus 201 to delete the image file of the document data.

At step S312, the facsimile server 118 notifies the client on LAN 119, who made the transmission request, of the communication results in connection with all destinations.

Figure 4:
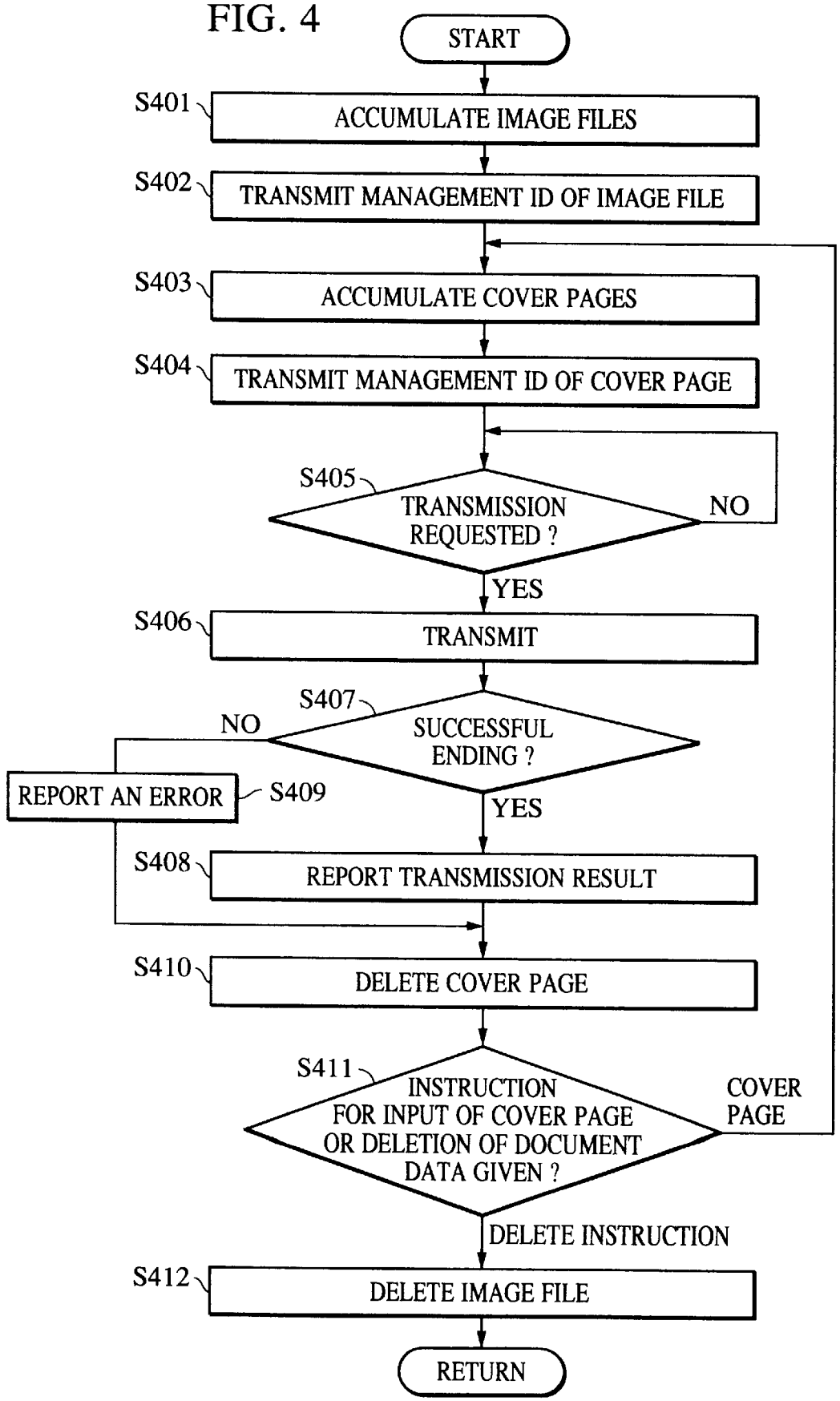
FIG. 4 is a flow diagram showing the flow of process by a facsimile apparatus 201 when document data is transmitted to a destination.

FIG. 4 is a flow diagram showing the flow of process by the facsimile apparatus 201 when it transmits the document data transferred from the facsimile server 118. The flow diagram shows the process flow the CPU 101 takes under the control of a program stored in ROM 102.

At step S401, the image memory 104 stores the document data (image file) that is input from the facsimile server 118 via the interface control module 115. At step S402, the facsimile apparatus 201 notifies the facsimile server 118 of the management ID number of the stored image file.

The facsimile apparatus 201 receives the image file of the cover page from the facsimile server 118 and stores it in the image memory 104 at step S403. The facsimile server 118 is notified of the management ID number of the cover page at step S404. The image memory 104 stores the image file corresponding to the management ID number.

When the transmission request is received from the facsimile server 118 at step S405, the sequence goes to step S406, where the facsimile apparatus 201 transmits to a partner communication apparatus the image data contained in the image file via the communication line 116, based on the telephone number of the destination included in the transmission request command. In this case, as specified by the facsimile server 118, the cover page is transmitted first, followed by the document data.

When the facsimile apparatus 201 determines at step S407 that the transmission has successfully been completed, the facsimile apparatus 201 notifies the facsimile server 118 of a normal termination of transmission at step S408. When the transmission ends with an abnormal termination, the facsimile apparatus 201 notifies the facsimile server 118 of the occurrence and cause of an error at step S409. The recording module 114 prints out an error report. The information about the communication result is stored in RAM 103.

The image file of the cover page that was transmitted is deleted from the image memory 104 at step S410. At step S411, a determination is made of whether the facsimile apparatus 201 has received an input of a next cover page or a delete command of the image file of the document data from the facsimile server 118. When the input is a cover page, the sequence starts over at step S403. An input of a delete command means that the transmission to all destinations is completed, and at step S412, the image files of the document data specified are deleted from the image memory 104.

As described above, according to the above embodiment, the same document is broadcast to a plurality of destinations with a cover page specific to each destination attached while unnecessary redundant transfer process involved is reduced.

The deletion of unnecessary image file allows the image memory to be used in an efficient manner.

Discussed next is the operation of the facsimile apparatus when it outputs a communication result report with an image. The communication result of a transmitted image (document data) is output along with a part of the image. The communication result includes information about whether last transmission ends with a normal or abnormal termination, the cause if the transmission ends with an abnormal termination, and further information about time, page, an addressee, and a sender. The image associated with the report may be selected between the cover page and the first page of the document data. The selection setting is stored in RAM 103 through the operation panel 105, or from the facsimile server 118 or a client machine on LAN 119, via the interface control module 115.

Figure 5:
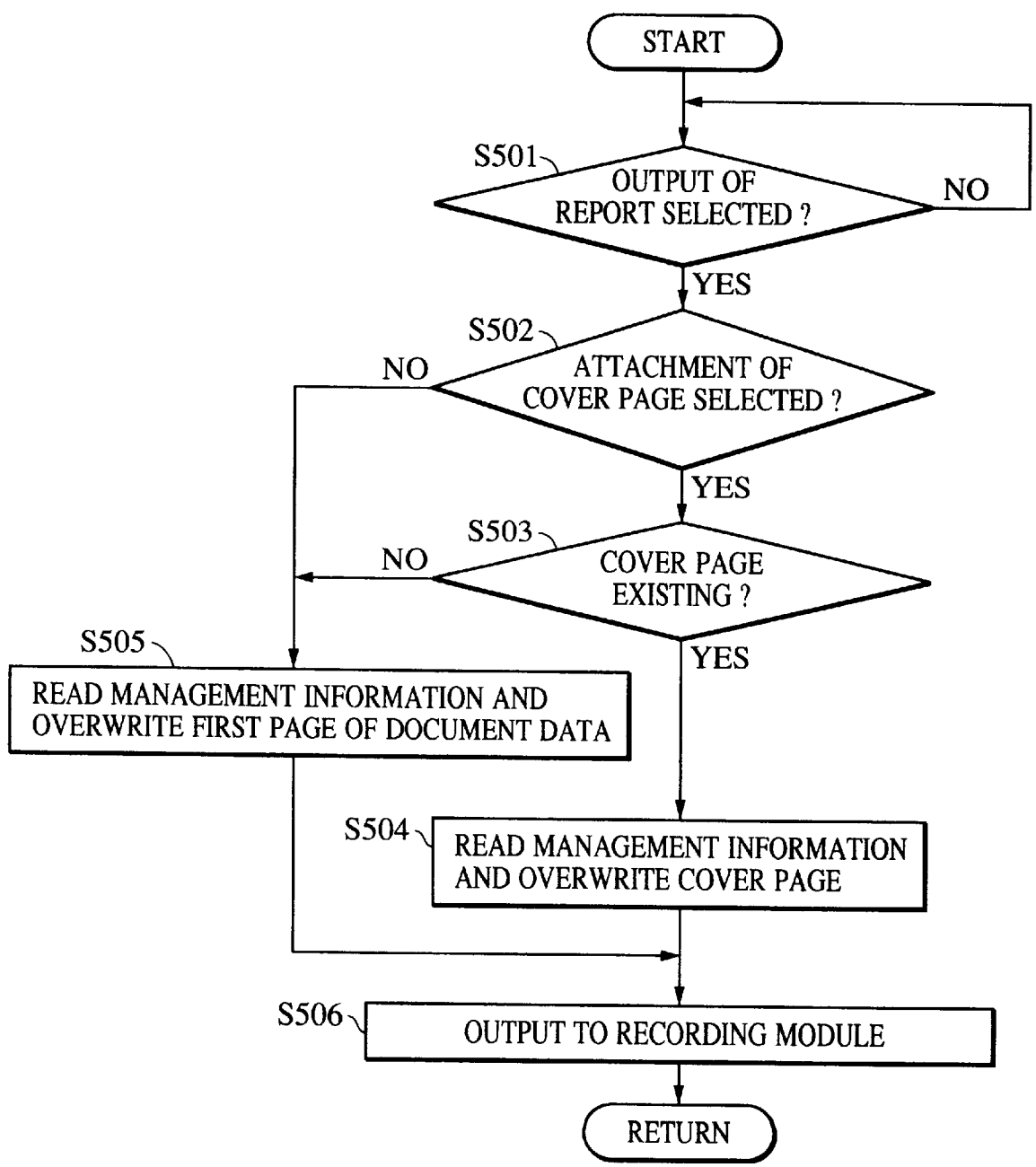
FIG. 5 is a flow diagram showing the flow of process by the facsimile apparatus 201 when a communication result report is output.

FIG. 5 is a flow diagram showing the flow of process of a report output by the facsimile apparatus 201. The flow diagram shows the process flow the CPU 101 takes under the control of a program stored in ROM 102.

At step S501, the facsimile apparatus 201 determines whether a report output function is selected. The report output function is selected in response to an instruction of report outputting from the operation panel 105 or a transmission error or a transmission end. When the report output function is selected, the sequence goes to step S502, where a determination is made of whether a cover page is selected as an image associated with the communication report. When it is a cover page, the sequence goes to step S503. When it is not, the sequence goes to step S505.

At step S503, the facsimile apparatus 201 determines whether the image memory 104 stores the cover page. When the image memory 104 stores the cover page, the sequence goes to step S504. When the image memory 104 holds no cover page, the sequence goes to step S505.

At step S504, communication management information is read from RAM 103, and is expanded into the image memory 104 in accordance with a predetermined format. Thus, the management information overwrites partly the cover page (over predetermined lines from the top of the page). At step S506, the recording module 114 prints out one page with the management information on the top portion thereof and the image on the bottom portion thereof.

At step S505, the communication management information is output the same way as in step S504, and then overwrites, in printout, part (predetermined lines from the top of the page) of the document data (the first page of the next file when the document data is transmitted with the cover page attached or the first page of the first file when the document data is transmitted with no cover page attached).

As described above, a report with an appropriate image (meeting the needs of an operator) is provided.

In the above embodiment, a cover page is attached when a document is transmitted. When document data is received via the communication line 116 with a plurality of clients on LAN 119 specified as destinations, the facsimile server 118 may create a cover page.

In the above embodiment, the facsimile apparatus 201 is linked to LAN 119 via the facsimile server 118. Alternatively, the facsimile apparatus 201 is provided with all or part of the functions of the facsimile server 118, and is then linked to LAN 119.

The flow diagram shown in FIG. 3 is based on the program installed in the facsimile server 118, and the flow diagrams shown in FIGS. 4 and 5 are based on the programs stored in ROM 102. These programs may be stored in a detachable storage medium such as a magneto-optical disk and the information of the programs may be applied another apparatus which can read it.

According to the embodiment described above, when document data is transmitted to a plurality of destinations in the system comprising an external apparatus and a data communication apparatus, a cover page specific to each destination is attached to the document data without transferring the document data repeatedly.

The present invention may be incorporated in a system made up of a plurality of apparatuses (a host computer, interface apparatuses, a reader, a printer and the like) or in a single apparatus (a copying machine or a facsimile machine).

The program code of a software for carrying out the function of the embodiment may be loaded in a computer in an apparatus or a system linked to devices that actually carry out the function of the above embodiment, and the devices are controlled under the program stored in the computer (CPU or MPU) in the apparatus or system. Such an arrangement also falls within the scope of the present invention.

In the above arrangement, the program code itself of the software performs the function of the embodiment, and thus, the program code itself, and means for supplying the program code to the computer, for example, a storage medium that stores such a program code, constitute the present invention.

Available as the storage medium for storing the program code may be a floppy disk, a hard disk, a magneto-optical disk, a CD-ROM, a magnetic tape, a non-volatile memory card, a ROM or the like.

To carry out the function of the embodiment, the program code may work in cooperation with an operation system (OS) and other applications in the computer. Such a program code falls within the scope of the present invention.

The program code may be stored in a memory mounted on a feature expansion board or unit in the computer and a CPU or the like in the feature expansion board or unit performs partly or entirely the process based on the program code to carry out the function of the embodiment. Such an arrangement falls within the scope of the present invention.

Although the present invention has been described with respect to a preferred embodiment thereof, many variations and modifications are possible within the scope of the invention defined by the claims.

What is claimed is:

1. A data communication method employed in a data communication system comprising an external apparatus, and a data communication apparatus having interconnecting means for connecting to the external apparatus, memory means for storing data, and transmitting means for transmitting the data to communication partners, comprising:

the step of inputting, via the interconnecting means to the communication apparatus, document data to be transmitted by the transmitting means;

the step of storing the input document data in the memory means; and the step of reading the document data stored in the memory means and transmitting through the transmitting means the document data with a cover page when the external apparatus inputs the cover page specific to each of the communication partners to the data communication apparatus via the interconnecting means to transmit the document data to a plurality of communication partners, wherein the cover page is input independently of the document data and the cover page inputted each the plurality of communication partner and the document data stored in the memory means are transmitted.

2. A data communication method according to claim 1 further comprising the step of deleting the document data from the memory means when the transmission to the plurality of communication partners is completed.

3. A data communication method according to claim 1, wherein the external apparatus creates the cover page specific to each communication partner based on communication partner information input, and inputs the created cover page to the data communication apparatus.

4. A data communication method according to claim 3, wherein the external apparatus is linked to a local area network, receives a transmission request from a terminal on the local area network, and creates the cover page based on the communication partner information contained in the transmission request.

5. A data communication method according to claim 1, wherein the transmitting means transmits a plurality of data specified by the external apparatus.

6. A data communication method according to claim 1, wherein the transmitting means transmits a plurality of data according to the order of transmission specified by the external apparatus.

7. A data communication method according to claim 1, wherein the data communication apparatus further comprises output means for outputting data in a visible form, wherein the output means outputs at least part of an image, represented by the document data, along with management information related to the document data.

8. A data communication method according to claim 7, wherein the output means selects data to be output, so that, based on the selection result, the output means outputs at least part of the image of the cover page or at least part of the image of the document data, along with the management information related to the document data.

9. A computer readable program, stored in a storage medium of a data processing apparatus, said program comprising:

(a) the step of outputting a document to be transmitted to a communication partner to a data communication apparatus connected to the data processing apparatus to communicate with the communication partner;

(b) the step of inputting information to transmit the document to a plurality of communication partners;

(c) the step of creating cover information to be attached to the document, based on the information input at the inputting step;

(d) the step of specifying the cover information specific to one communication partner created at the cover information creating step and the document output at the outputting step, and causing the data communication apparatus to transmit the document and the cover information in a series of information; and (e) the step of repeating the step (d) until the transmission process to all communication partners input at the inputting step is completed.

10. A computer readable program, stored in a storage medium of a data communication apparatus, said program comprising:

the first step of inputting, to the data communication apparatus via an external apparatus connected to the data communication apparatus, a document to be transmitted to a plurality of communication partners;

the step of storing in a memory the document input at the at the first inputting step;

the second step of inputting cover information specific to one communication partner via the external apparatus;

the transmission step of reading out the document stored at the storing step in response to the cover information input at the second inputting step, and transmitting the cover information and the document to the communication partner specified by the cover information; and the step of controlling to repeat the second inputting step and the transmission step until the transmission of the document stored at the storing step to all communication partners is completed.

11. A controlling method of data processing apparatus, comprising:

(a) the step of outputting a document to be transmitted to a communication partner to a data communication apparatus connected to the data processing apparatus to communicate with the communication partner;

(b) the step of inputting information to transmit the document to a plurality of communication partners;

(c) the step of creating cover information to be attached to the document, based on the information input at the inputting step;

(d) the step of specifying the cover information specific to one communication partner created at the cover information creating step and the document output at the outputting step, and causing the data communication apparatus to transmit the document and the cover information in a series of information; and (e) the step of repeating the step (d) until the transmission process to all communication partners input at the inputting step is completed.

12. A controlling method for controlling a data communication apparatus, comprising:

the first step of inputting, to the data communication apparatus via an external apparatus connected to the data communication apparatus, a document to be transmitted to a plurality of communication partners;

the step of storing in a memory the document input at the at the first inputting step;

the second step of inputting cover information specific to one communication partner via the external apparatus;

the transmission step of reading out the document stored at the storing step in response to the cover information input at the second inputting step, and transmitting the cover information and the document to the communication partner specified by the cover information; and the step of controlling to repeat the second inputting step and the transmission step until the transmission of the document stored at the storing step to all communication partners is completed.

13. A data processing apparatus comprising:

connection means for connecting a data communication apparatus to communicate with a communication partner;

output means for outputting document data to be transmitted to the communication partner to the data communication apparatus through said connection means;

input means for inputting information to transmit the document data output by said output means to a plurality of communication partners;

creating means for creating cover information to be attached to the document data, based on the information input by said input means;

instructing means for instructing the data communication apparatus such that the cover information created by said creating means and the document data output by said output means are specified and transmitted; and control means for controlling to repeat the creation of the cover information by said creating means and the instruction by said instructing means for each of the communication partners, which transmits the document data outputted by said output means.

14. A data communication apparatus comprising:

connection means for connecting a data processing apparatus;

first input means for inputting document data, from the data processing apparatus through said connection means, to be transmitted to a plurality of communication partners;

storing means for storing the document data input by said first input means;

second input means for inputting cover information to specific one communication partner from among the plurality of communication partners from the data processing apparatus through said connection means;

transmitting means for transmitting the document data stored in said storing means and cover information input by said second input means; and control means for controlling to repeat the input of each plurality of communication partners which transmits the document data inputted by said first input means and the transmission of them with said transmitting means.

15. A data communication apparatus comprising:

first input means for inputting document information;

second input means for inputting cover information to a specific communication partner;

transmitting means for transmitting the document information input by said first input means and the cover information input by said second input means to the communication partner;

output means for outputting a report indicating a result of transmission by said transmitting means attached information transmitted by said transmitting means; and setting means for setting whether the information attached to the report to be output by said output means is determined as the document information input by said first input means or the cover information input by said second input means, wherein said output means outputs the report attached by the information depending on how said setting means sets the information.

16. A method for controlling a data communication apparatus, comprising:

first inputting document information;

second, inputting cover information to a specific communication partner;

transmitting the document information input in said first inputting step and the cover information input in said second inputting step to the communication partner;

outputting a report indicating a result of transmission in said transmitting step attached information transmitted in said transmitting step; and setting whether the information attached to the report to be output in said outputting step is determined as the document information input in said first inputting step or the cover information input in said second inputting step, wherein said outputting step includes outputting the report attached by the information depending on how the information is set in said setting step.

17. A computer readable program, stored in a storage medium of a data communication apparatus, said program comprising:

first inputting document information;

second, inputting cover information to a specific communication partner;

transmitting the document information input in said first inputting step and the cover information input in said second inputting step to the communication partner;

outputting a report indicating a result of transmission in said transmitting step attached information transmitted in said transmitting step; and setting whether the information attached to the report to be output in said outputting step is determined as the document information input in said first inputting step or the cover information input in said second inputting step, wherein said outputting step includes outputting the report attached by the information depending on how the information is set in said setting step.

* * * * *

UNITED STATES PATENT AND TRADEMARK OFFICE
CERTIFICATE OF CORRECTION

PATENT NO. : 5,973,791
DATED : October 26, 1999
INVENTOR(S) : SOICHI YAMAMURO ET AL.

It is certified that error appears in the above-identified patent and that said Letters Patent is hereby corrected as shown below:

COLUMN 2:

Line 62, "of" should read --of the--.

COLUMN 3:

Line 26, "softwares" should read --software--; and
Line 29, "CPU" should read --the CPU--.

COLUMN 5:

Line 22, "file" should read --files--; and
Line 29, "last" should read --the last--.

COLUMN 6:

Line 23, "another" should read --to another--.

COLUMN 8:

Line 20, "at the" should be deleted; and
Line 61, "at the" should be deleted.

UNITED STATES PATENT AND TRADEMARK OFFICE
CERTIFICATE OF CORRECTION

PATENT NO. : 5,973,791

DATED : October 26, 1999

INVENTOR(S) : SOICHI YAMAMURO ET AL.

It is certified that error appears in the above-identified patent and that said Letters Patent is hereby corrected as shown below:

<u>COLUMN 10</u>:

Line 17, "first" should read --first,--; and
    Line 39, "first" should read --first,--.

Signed and Sealed this

First Day of May, 2001

Attest:

NICHOLAS P. GODICI

Attesting Officer     Acting Director of the United States Patent and Trademark Office